US011783103B2

(12) United States Patent
Govind et al.

(10) Patent No.: US 11,783,103 B2
(45) Date of Patent: Oct. 10, 2023

(54) SYSTEMS AND METHODS FOR AN ACCELERATING PRODUCT FORMULATION CREATION VIA IMPLEMENTING A MACHINE LEARNING-DERIVED GRAPHICAL FORMULATION NETWORK MODEL

(71) Applicant: Turing Labs, Inc., New York, NY (US)

(72) Inventors: Ajith Govind, Bengaluru (IN); Manmit Shrimali, Oakville (CA); Michael L. Thompson, Cincinnati, OH (US)

(73) Assignee: Turing Labs, Inc., New York, NY (US)

( * ) Notice: Subject to any disclaimer, the term of this patent is extended or adjusted under 35 U.S.C. 154(b) by 0 days.

(21) Appl. No.: 18/105,243

(22) Filed: Feb. 2, 2023

(65) Prior Publication Data

US 2023/0244838 A1 Aug. 3, 2023

Related U.S. Application Data

(60) Provisional application No. 63/305,877, filed on Feb. 2, 2022.

(51) Int. Cl.
*G06F 30/27* (2020.01)
*G06F 111/08* (2020.01)

(52) U.S. Cl.
CPC .......... *G06F 30/27* (2020.01); *G06F 2111/08* (2020.01)

(58) Field of Classification Search
CPC . G06F 30/27; G06F 2111/08; G06Q 30/0621; G06N 5/022; G06N 5/025; G06N 3/045; G06N 3/08; G06N 5/01; G06N 20/00; G06N 7/01
See application file for complete search history.

(56) References Cited

U.S. PATENT DOCUMENTS

| 10,984,145 | B1 * | 4/2021 | Hutchinson | G06F 16/9024 |
|---|---|---|---|---|
| 11,315,663 | B2 * | 4/2022 | Pappas | G16C 20/10 |
| 11,594,317 | B2 * | 2/2023 | Neumann | G16H 50/30 |
| 2019/0057313 | A1 * | 2/2019 | Hirshman | G06N 3/126 |
| 2021/0280276 | A1 * | 9/2021 | Gupta | G06N 3/08 |
| 2022/0092659 | A1 * | 3/2022 | Ristoski | G06N 5/025 |
| 2022/0093218 | A1 * | 3/2022 | Ruan | G16C 60/00 |
| 2022/0392598 | A1 * | 12/2022 | Giles | G16H 20/10 |

* cited by examiner

*Primary Examiner* — Nha T Nguyen
(74) *Attorney, Agent, or Firm* — Padowithz Alce; Alce PLLC

(57) ABSTRACT

A method and system for implementing one or more machine learning models for accelerating formulation design for a target product that includes converting an unsupervised formulation network model to a supervised formulation network model, deriving an outcome-contributory value for each of a plurality of distinct design variables of the supervised formulation network, identifying a dependency connection between each of a plurality of distinct pairs of distinct design variables, computing a strength of connection metric value for each of the plurality of distinct pairs of distinct design variables; and generating, via a graphical user interface, a graphical rendering of the supervised formulation model that may be manipulated to accelerate for design of a proposed formulation for a target physical product.

17 Claims, 6 Drawing Sheets

200

Sourcing a Corpus of Formulation Data S210

Generating an Unsupervised Formulation Model S220

Generating a Supervised Formulation Model S230

Computing Parameter Values of the Model S240

Generating a Graphical Rendering of the Supervised Formulation Model S250

FIGURE 2

SYSTEMS AND METHODS FOR AN ACCELERATING PRODUCT FORMULATION CREATION VIA IMPLEMENTING A MACHINE LEARNING-DERIVED GRAPHICAL FORMULATION NETWORK MODEL

CROSS-REFERENCE TO RELATED APPLICATIONS

This application claims the benefit of U.S. Provisional Application No. 63/305,877, filed 2 Feb. 2022, which is incorporated in its entirety by this reference.

TECHNICAL FIELD

This invention relates generally to the product formulation technology field, and more specifically to new and useful systems and methods for intelligent formulation discovery in the product formulation technology field.

BACKGROUND

Modern product formulation may be complex and obfuscated, which may create several challenges in product formulation and product experimentation. In particular, institutional knowledge of formulation data for a given product is often distributed in some known and unknown spaces. Additionally, formulation knowledge of expert formulators may not be memorialized in a manner that can be easily transferable into new product formulations.

Accordingly, the disconnect in sources of institutional formulation knowledge creates formulation data gaps, formulation data anomalies, and formulation data conflicts that reduce efficiencies, accuracies, and the quality of product formulations without a single source of truth for formulation data.

Thus, there is a need in the product formulation technology to automatically generate formulation recommendations that have a high probability or likelihood of satisfying formulators' formulation objectives while minimizing a total quantity of real-world experimentations conducted by the formulators. Additionally, there is a further need in product formulation technology to generate formulation recommendations that may be diversity-enhanced in which the formulation recommendations may be intelligently discovered during exploration and exploitation phases in new, under-searched, or un-explored regions of a formulation space.

The embodiments of the present application described herein provide technical solutions that address, at least the needs described above.

BRIEF SUMMARY OF THE INVENTION(S)

In one embodiment, a computer-implemented method for accelerating formulation design for a physical product includes at a remote formulation service that is implemented by a network of distributed computing systems: generating an unsupervised formulation network model based on applying a probabilistic graphical model over design variable feature data extracted from a corpus of product formulation data; converting the unsupervised formulation network model to a supervised formulation network model based on setting a formulation outcome for the unsupervised formulation network model; deriving an outcome-contributory value for each of a plurality of distinct design variables of the supervised formulation network; identifying a dependency connection between each of a plurality of distinct pairs of distinct design variables of the supervised formulation network based on a computation of dependency values between the plurality of distinct pairs of distinct design variables; computing a strength of connection metric value for each of the plurality of distinct pairs of distinct design variables having the dependency connection, wherein the strength of connection metric value indicates an estimated contribution of a target pairing of design variables toward the value of the formulation outcome; and generating, via a graphical user interface, a graphical rendering of the supervised formulation network model, wherein the graphical rendering of the supervised formulation network model comprises: a plurality of distinct nodes representing the plurality of distinct design variables, wherein a display size of each of the plurality of distinct nodes is differentiated based on the derived outcome-contributory value for each of the plurality of distinct design variables; and a plurality of distinct graphical connections between the distinct pairs of the plurality of distinct design variables, wherein each of the plurality of distinct graphical connections is set based on the identifying the dependency connection between each of the plurality of distinct pairs of distinct design variables, and wherein a display size of each of the plurality of distinct graphical connections is differentiated based on the computation of the strength of connection metric value for each of the plurality of distinct pairs of distinct design variables having the dependency connection.

In one embodiment, the method includes creating a plurality of distinct instances of the supervised formulation network model based setting a distinct formulation target for each of a plurality of distinct instances of the unsupervised formulation network.

In one embodiment, the method includes rendering, via the graphical user interface, a graphical object comprising a toggle that, when manipulated by input of a user, switches between the plurality of distinct instances of the supervised formulation network model, wherein the switching changes a display of the graphical user interface from a first instance of the supervised formulation network model having a setting of a first formulation outcome to a second instances of the supervised formulation network model having a setting of a second formulation outcome.

In one embodiment, each of the plurality of distinct nodes representing the plurality of distinct design variables within the supervised formulation network model is selectable via a user selection comprising one or more of a user action or a user input applied to the graphical rendering of the supervised formulation network model.

In one embodiment, in response to the user selection, modifying an appearance of the graphical rendering of the supervised formulation network model, and the modification includes reducing an opacity of the plurality of distinct nodes of the supervised formulation network model that are not selected.

In one embodiment, in response to the user selection of a distinct node of the plurality of distinct nodes, modifying an appearance of the graphical rendering of the supervised formulation network model, the modification includes increasing a prominence of a subset of the plurality of distinct nodes of the supervised formulation network model that are connected to the distinct node selected by the user based on the strength of connection metric value of the subset of the plurality of distinct nodes to the distinct node satisfying a minimum strength of connection metric value.

In one embodiment, in response to the user selection of a distinct node of the plurality of distinct nodes, modifying an appearance of the graphical rendering of the supervised formulation network model, the modification includes increasing a prominence of a distinct dependency connection between the distinct node and one node of the plurality of distinct nodes having a highest strength of connection metric value to the distinct node.

In one embodiment, the unsupervised formulation network model relates to a plurality of distinct design variables of the corpus of product formulation data represented by the plurality of distinct nodes that are interconnected based on derived relationship inferences of the probabilistic graphical model.

In one embodiment, the converting includes: interconnecting at least a subset of the plurality of distinct nodes of the unsupervised formulation network model to a user-immutable node associated with the formulation outcome based on identifying that each design variable associated with the subset of the plurality of distinct nodes probabilistically contribute to a value of the formulation outcome.

In one embodiment, outcome-contributory value indicates an estimated contribution of a target design variable to a value of the formulation outcome when present as a component in a formulation.

In one embodiment, deriving the outcome-contributory value for each one of the plurality of distinct design variables includes calculating a standardized direct effect metric value for each one of the plurality of distinct design variables based on: identifying a first ratio comprising a measure of change in the value of the formulation outcome relative to a measure of change in a value of a target one of the plurality of distinct design variables; and identifying a product between the first ratio and a second ratio comprising a standard deviation of the target one of the plurality of distinct design variables over a standard deviation of the formulation outcome.

In one embodiment, wherein defining the dependency connection between each of a plurality of distinct pairs of distinct design variables includes: applying a structural learning algorithm over a plurality of design variable nodes of the supervised formulation network; setting a dependency significance threshold, wherein if a computed dependency value for a distinct pair of design variables satisfies the dependency significance threshold, then setting a distinct dependency connection between the distinct pair of design variables.

In one embodiment, computing a strength of connection metric value for each of the plurality of distinct pairs of distinct design variables includes: implementing a parameter learning algorithm that estimates a conditional probability distribution for each of the plurality of distinct variables of the supervised formulation network; computing a first Kullback-Leibler (KL) divergence between a conditional probability distribution for each of the plurality of distinct variables with the dependency connection; compute a second KL divergence between a conditional probability distribution for each of the plurality of distinct variables without the dependency connection; and wherein the strength of connection metric value for a respective one of the plurality of distinct pairs is based on a summation of the first KL divergence and the second KL divergence for the respective one of the plurality of distinct pairs.

In one embodiment, the method includes generating a target formulation proposal that likely satisfies a target formulation objective based on extracting a plurality of distinct design variables from the supervised formulation network.

In one embodiment, the probabilistic graphical model comprises a Bayesian network model; and the unsupervised formulation network model comprises a directed acyclic graph.

In one embodiment, a method includes generating, by one or more computers, an unsupervised formulation network model based on applying a probabilistic graphical model over design variable feature data extracted from a corpus of product formulation data; converting the unsupervised formulation network model to a supervised formulation network model based on setting a formulation outcome for the unsupervised formulation network model; deriving an outcome-contributory value for each of a plurality of distinct design variables of the supervised formulation network; identifying a dependency connection between each of a plurality of distinct pairs of distinct design variables of the supervised formulation network based on a computation of dependency values between the plurality of distinct pairs of distinct design variables; computing a strength of connection metric value for each of the plurality of distinct pairs of distinct design variables having the dependency connection, wherein the strength of connection metric value indicates an estimated contribution of a target pairing of design variables toward the value of the formulation outcome; and generating, via a graphical user interface, a graphical rendering of the supervised formulation network model, wherein the graphical rendering of the supervised formulation network model comprises: a plurality of distinct nodes representing the plurality of distinct design variables, wherein a display size of each of the plurality of distinct nodes is differentiated based on the derived outcome-contributory value for each of the plurality of distinct design variables; and a plurality of distinct graphical connections between the distinct pairs of the plurality of distinct design variables, wherein each of the plurality of distinct graphical connections is set based on the identifying the dependency connection between each of the plurality of distinct pairs of distinct design variables, and wherein a display size of each of the plurality of distinct graphical connections is differentiated based on the computation of the strength of connection metric value for each of the plurality of distinct pairs of distinct design variables having the dependency connection.

In one embodiment, a computer-program product embodied in a non-transitory machine-readable storage medium storing computer instructions that, when executed by one or more processors, perform operations including generating, by one or more computers, an unsupervised formulation network model based on applying a probabilistic graphical model over design variable feature data extracted from a corpus of product formulation data; converting the unsupervised formulation network model to a supervised formulation network model based on setting a formulation outcome for the unsupervised formulation network model; deriving an outcome-contributory value for each of a plurality of distinct design variables of the supervised formulation network; identifying a dependency connection between each of a plurality of distinct pairs of distinct design variables of the supervised formulation network based on a computation of dependency values between the plurality of distinct pairs of distinct design variables; computing a strength of connection metric value for each of the plurality of distinct pairs of distinct design variables having the dependency connection, wherein the strength of connection metric value indicates an estimated contribution of a target pairing of design variables toward the value of the formulation outcome; and generating, via a graphical user interface, a graphical rendering of the supervised formulation network model, wherein the graphical rendering of the supervised formulation network model comprises: a plurality of distinct nodes representing the plurality of distinct design variables, wherein a display size of each of the plurality of distinct nodes is differentiated based on the derived outcome-contributory value for each of the plurality of distinct design variables; and a plurality of distinct graphical connections between the distinct pairs of the plurality of distinct design variables, wherein each of the plurality of distinct graphical connections is set based on the identifying the dependency connection between each of the plurality of distinct pairs of distinct design variables, and wherein a display size of each of the plurality of distinct graphical connections is differentiated based on the computation of the strength of connection metric value for each of the plurality of distinct pairs of distinct design variables having the dependency connection.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Machine Learning-Based Product Formulation System & Service

Figure 1:
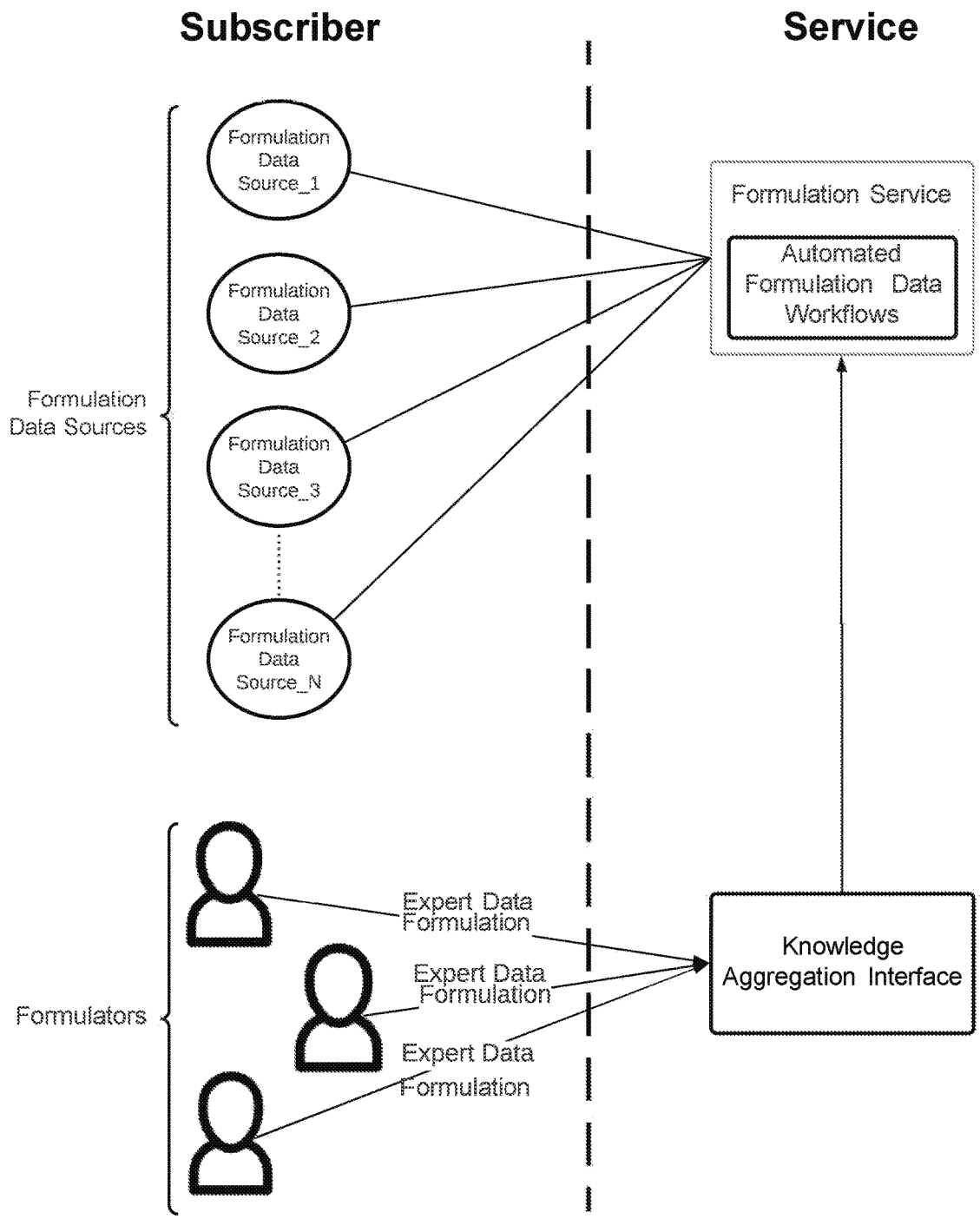
FIG. 1 illustrates a schematic representation of a system 100 in accordance with one or more embodiments of the present application.
Figure 3:
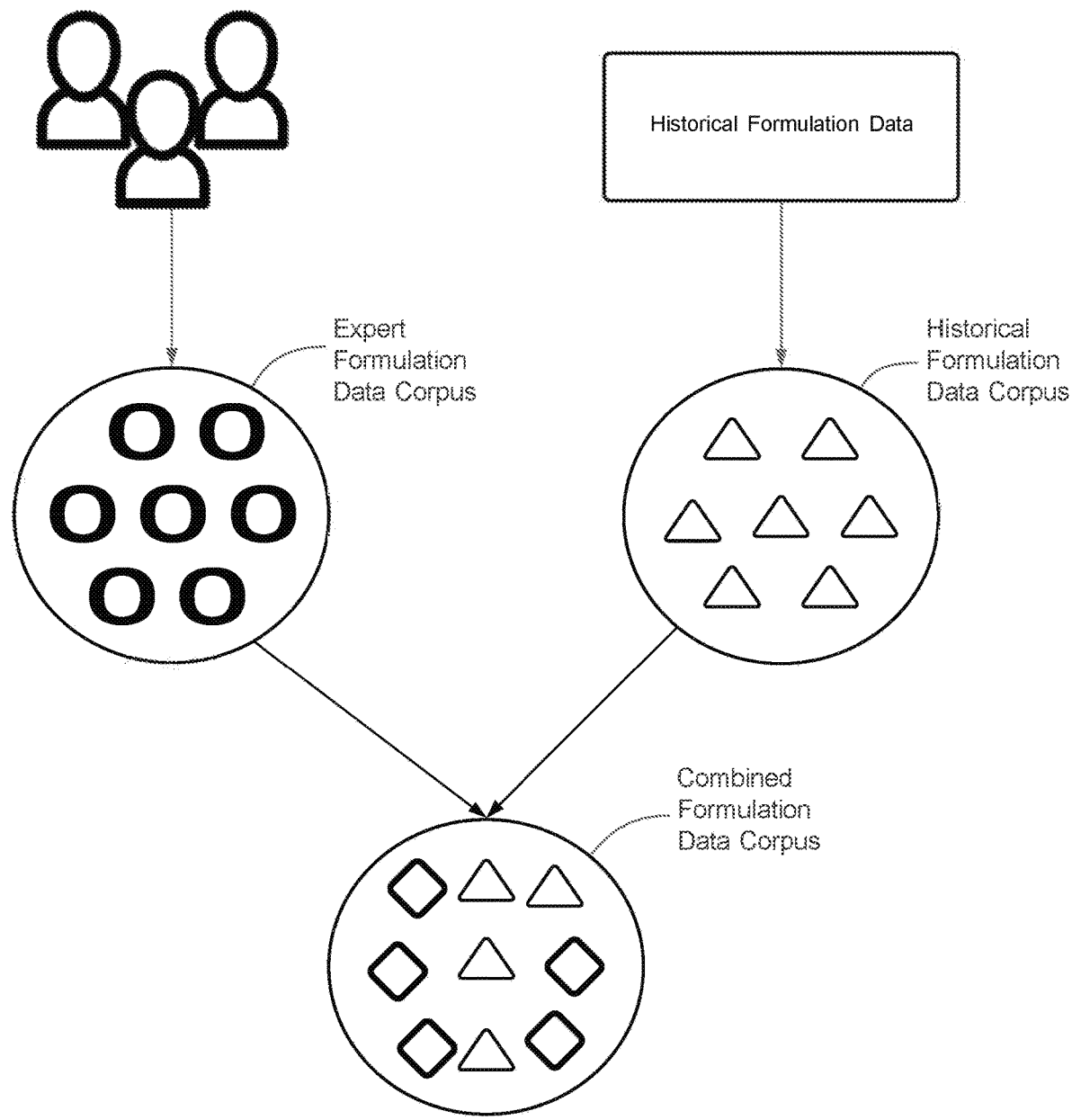
FIG. 3 illustrates an example schematic of expert formulator data integration in accordance with one or more embodiments of the present application.
Figure 4:
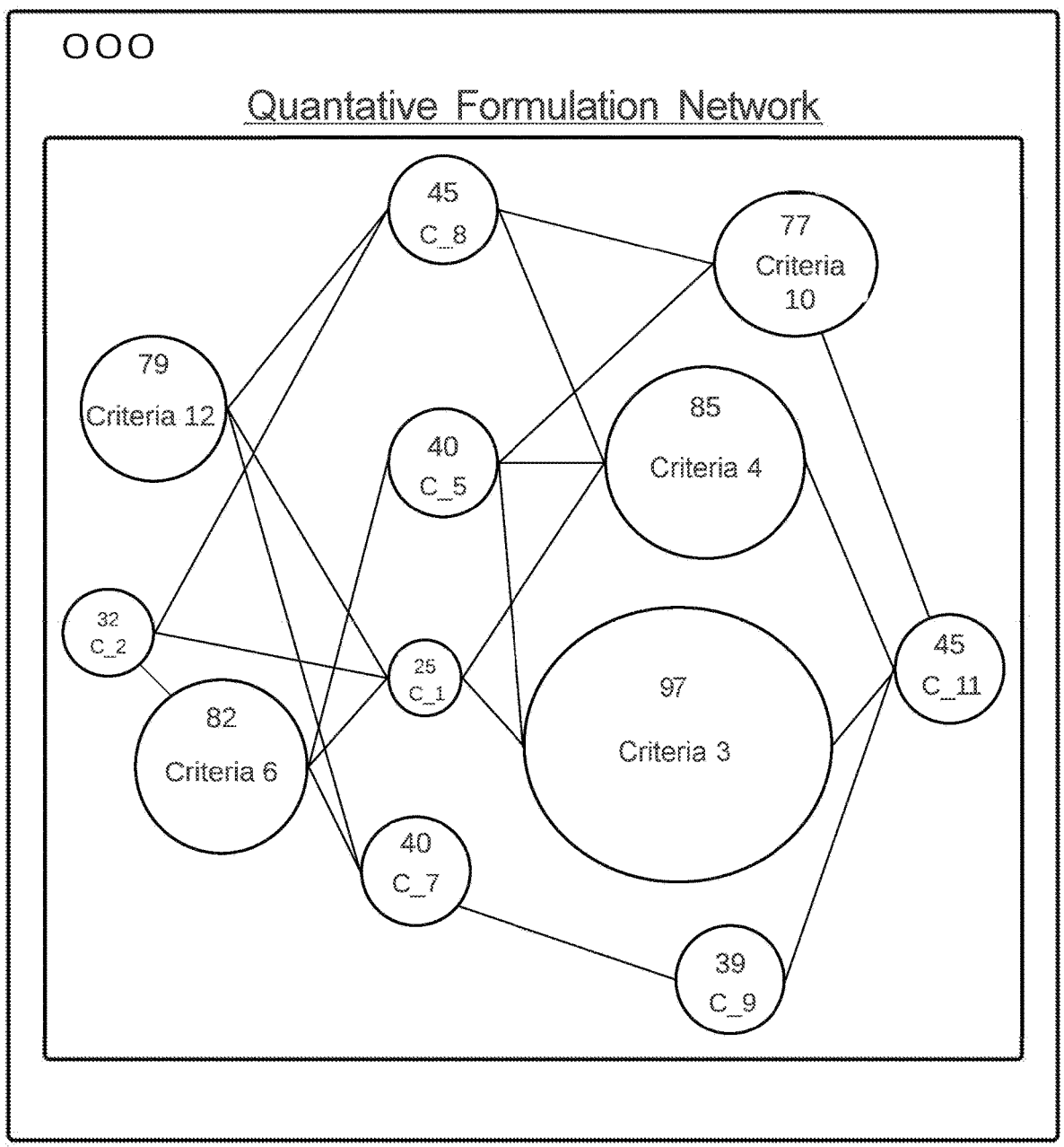
FIG. 4 illustrates an example schematic of a formulation network in accordance with one or more embodiments of the present application.
Figure 5:
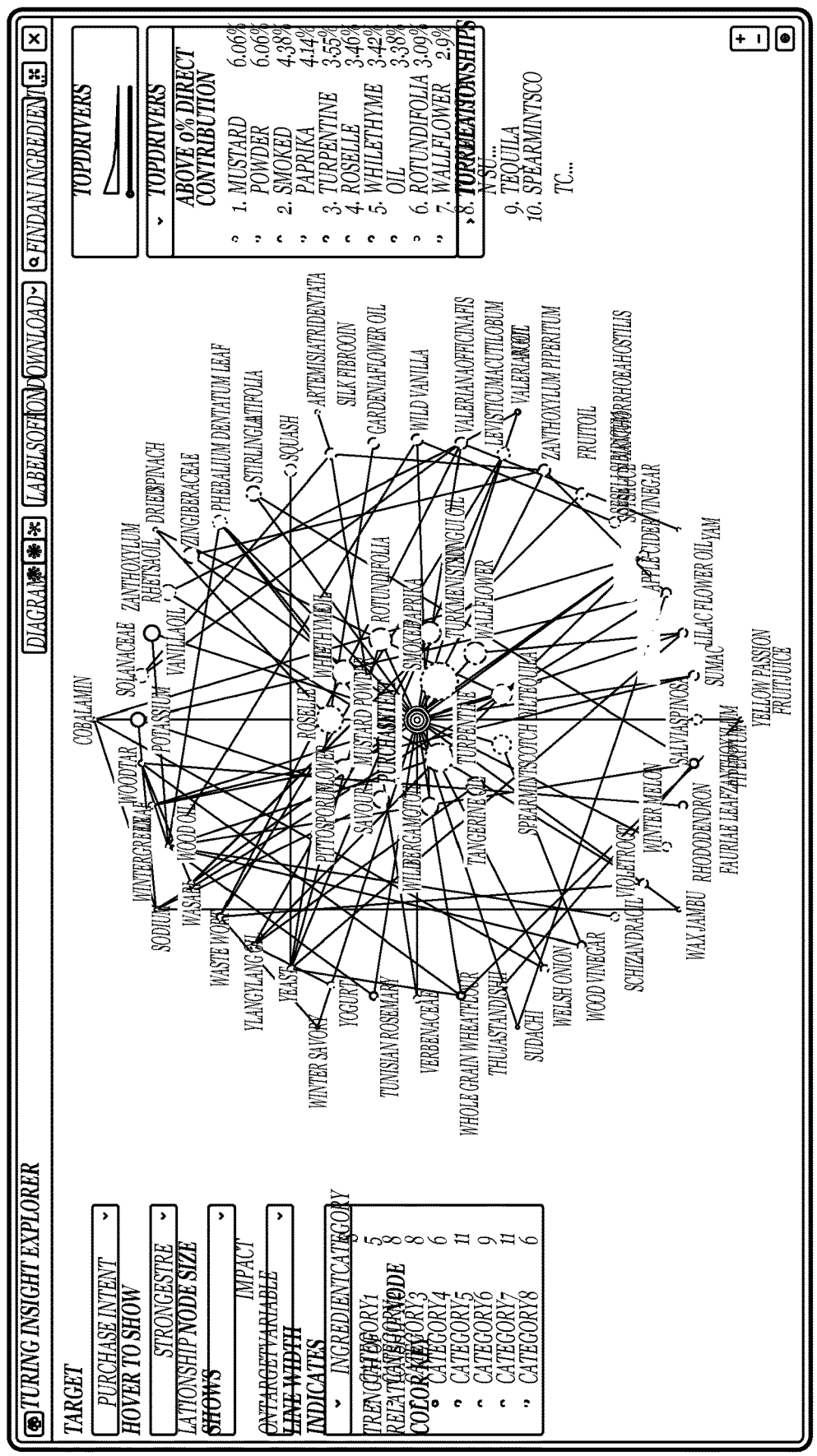
FIG. 5 illustrates an example schematic of a supervised formulation network model in accordance with one or more embodiments of the present application.
Figure 6:
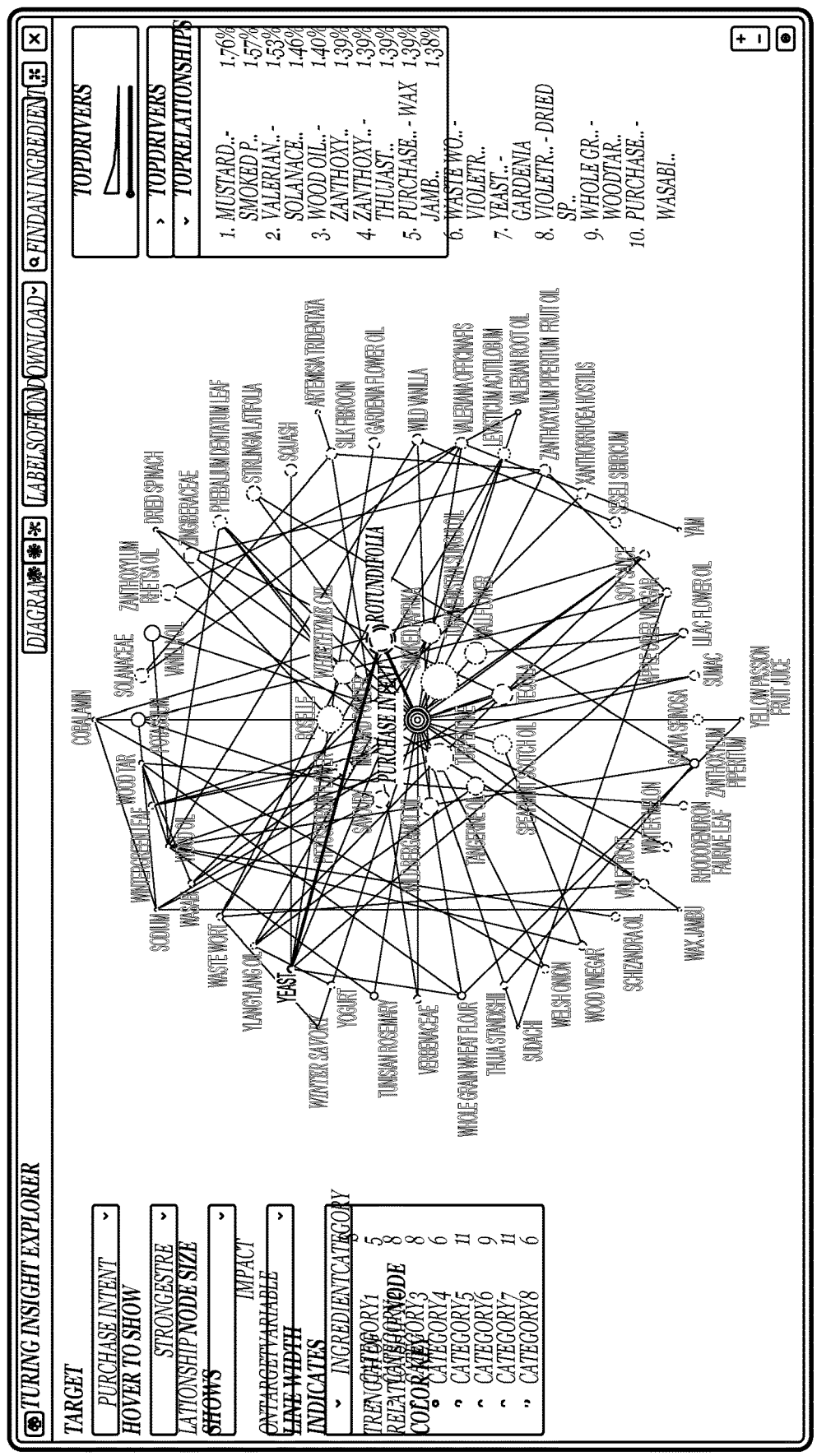
FIG. 6 illustrates an example schematic of a supervised formulation network model with a modified appearance in accordance with one or more embodiments of the present application.

As shown in FIG. 1, a system 100 for intelligent product formulations and/or experimentations may include a remote formulation service 110 and expert formulation graphical user interface 120, as described in U.S. patent application Ser. No. 17/978,960, which is incorporated herein in its entirety.

The remote formulation service no, which may be referred to herein as the "formulation service", may have an integrated communication connection with a plurality of distinct sources of formulation data and/or product data of a target product. The remote formulation service no preferably enables an integration of formulator expertise data together with existing product formulation data and a generation of a visualization of the formulator expertise integrated structure, as shown by way of example in FIG. 1.

In one or more embodiments, the remote formulation service no includes a plurality of distinct formulation modules that provide enhanced formulation capabilities for intelligently generation of one or more formulations of a target product. In such embodiments, the remote formulation service no includes an insight explorer module, a lab bench module, and a workspace module. In one embodiment, the insight explorer module may enable formulators and/or subscribers to the formulation service to explore, evaluate, and/or manipulate one or more intelligent formulation tools, such as a quantitative formulation network (e.g., Digital Brain). In one embodiment, the lab bench module may provide one or more formulation tools including, but not limited to, a formulation simulation tool and a formulation optimization tool. In one embodiment, the workspace module may provide a virtual formulation workspace for creating product formulations, executing formulations, and/or storing formulation result data.

The expert formulation graphical user interface 120, which may be sometimes referred to herein as the "expert interface", may be in operable control communication with the remote formulation service 110. In one or more embodiments, the expert interface 120 may include a formulation application programming interface (API) that may be programmatically integrated with one or more APIs of the remote formulation service 110 and one or more APIs of one or more sources of formulation data and/or product data.

Additionally, or alternatively, the system or service 100 may include a machine learning subsystem (not shown) that may be intelligently configured to assist in automatically generating or setting formulation parameters and/or actively implement simulations and/or optimizations (e.g., for formulation experiments, etc.) of one or more formulations.

Additionally, or alternatively, the machine learning subsystem may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), (generative) adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4, ChatGPT (and all subsequent iterations), ELM0, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

2. Method for Diversity-Enhanced Formulation Discovery in a Machine Learning-Based Formulation Platform As shown by reference to FIG. 2, a method 200 for accelerating formulation design for a physical product includes sourcing formulation data S210, generating an unsupervised formulation network model S220, converting an unsupervised formulation network model to a supervised formulation network model S230, identifying parameters of the nodes and dependency connections of the supervised formulation network model S240, and generating a graphical rendering of the supervised formulation network model S250.

2.10 Sourcing Formulation Intelligence Data

S210, which includes sourcing a plurality corpora of formulation data, may function to collect and/or obtain distinct corpora of formulation data for a target product from one or more distinct sources of formulation data. Preferably, S210 when being implemented by a remote formulation service may function to interface, via a graphical user interface (GUI) or application programming interface, with a subscriber to the remote service implementing the method 200 and/or the system 100 for identifying and collecting the formulation data for the target product of the subscriber. In a preferred embodiment, at least one corpus of formulation data may be sourced via collecting historical or past formulation data derived from one or more formulation attempts (if any) for a target product.

Existing Formulation Data Upload

In one or more embodiments, S210 may function to source a corpus of historical formulation data from one or more distinct sources of historical formulation data of a subscribing user to one or more data repositories of the remote formulation service. In such embodiments, S210 may function to operably connect via a network and/or programmatically integrate a formulation service or system implementing the method 200 to the one or more distinct formulation data sources for a target product. One or more points of integration or connection, preferably, enable a discovery of and access to sources of historical formulation data and may further establish one or more channels through which selective portions of historical formulation data may be uploaded for evaluation and processing.

In one or more embodiments, the historical formulation data preferably includes quantitative data describing one or more formulation findings or results, formulation criteria and/or experimentation criteria for creating and/or revising a target product. The historical formulation data may additionally include results and/or outcomes of various experimentations performed for a product formulation discovery.

Additionally, or alternatively, when sourcing historical formulation data, S210 may function to direct and/or store each distinct type of historical formulation data to a distinct corpus (with the formulation service). In this way, S210 may function to delineate each distinct type of historical formulation data for downstream processing including, but not limited to, one or more component contributions, one or more experimental conditions, and/or component relationship processing. It shall be recognized that, while each distinct type of historical formulation data may be stored in a distinct corpus, together the plurality of distinct corpora of historical formulation data may define a global corpus of historical formulation data.

Expert Formulation Data Corpus|Expert Initiation

Additionally, or alternatively, S210 may function to source a corpus of expert-based formulation data from one or more distinct formulation experts. In a preferred embodiment, S210 may function to implement one or more automated formulation data workflows that, when executed, automatically interfaces with one or more formulation experts for systematically collecting expert formulation data via expertise prompts, expertise queries, data aggregation portals, formulation inquiries, and/or the like. Expert formulation data, as referred to herein preferably relates to a collection of human expert know-how and/or human expert aptitude in product criteria and product formulation criteria that is not generally known or available from other sources of product formulation sources. Accordingly, an expert formulator, as referred to herein, preferably relates to a system or human-expert having experience in formulating a category or type of target product for more than a threshold period of time (i.e., a minimum number of years of formulation experience or minimum number of formulation experiments performed as determined by industry professionals, policy, or guidance).

In one or more embodiments, when sourcing expert formulation data, S210 may function to implement a knowledge aggregation interface or portal (e.g., a web-accessible graphical user interface being operably controlled by a remote formulation service) that may be accessed or presented to a target expert for collection expert formulation data. Via the knowledge aggregation interface, S210 may function to execute one or more automated formulation data workflows that may operate to collect data for a plurality of formulation and product criteria or domains (e.g., topics) such as, but not limited to, expected product outcomes (e.g., variables), key product components (e.g., ingredients), formulation space conditions (e.g., lab conditions) that influence product outcomes, relationships between product components, constraints between relationships between product components, key relationships between product components and formulation space conditions, constraints between relationships between relationships between product components and formulation space conditions, synergistic relationships between product components, synergies between product components and formulation space conditions. In such embodiments, S210 may additionally or alternatively function to store responses and/or data collected for a given domain or topic in a distinct corpus.

Additionally, or alternatively, S210 may function to automatically perform a mapping between expert response data based on formulation expertise queries and a potential graphical node or a potential graphical edge of a likely qualitative formulation network. In one or more embodiments, each expertise prompt or expertise query presented via the web-accessible interface may be digital associated with an entry of a mapping data structure, such that a response to a distinct expertise prompt or expertise query may be routed to or input into a specific entry location within the mapping data structure (e.g., reference table or the like). Accordingly, in such embodiments, S210 may function to create a nodes and edges mapping, which may be in the form of a reference table or any suitable data structure, that aligns each answer of a formulation expert to a creation of a graphical node or a graphical edge in a qualitative formulation network. The nodes and edges mapping may be used as an input in a generation of the qualitative formulation network, as described in more detail herein.

Additionally, or alternatively, in some embodiments, the one or more automated formulation data workflows that may be executed for collecting formulation and product criteria data may be informed and/or derived based on an identification of a product type or product category for which formulation experiments may be desired.

Sourcing External & Miscellaneous Product Intelligence Data

Additionally, or alternatively, S210 may function to source external formulation and product intelligence data beyond formulation and/or product intelligence associated with a subscriber. In one or more embodiments, external formulation and product intelligence data may include data sourced from and/or via interactions with third parties (e.g., component or ingredient supplier intelligence) that support a product commercialization of a target product. Additionally, or alternatively, formulation and product intelligence data may include data sourced from users of a target product. Accordingly, external formulation and product intelligence data may be sourced from any external activity, pre-product formulation activity, and post-product formulation activity (e.g., commercialization activities including, but not limited to, product packaging activities, product processing activities, product delivery activities, and the associated trial and error data derived and/or obtained via observations of these activities.

2.20 Unsupervised Production Formulation Network Model

S220, which includes generating an unsupervised formulation network model, may function to generate an unsupervised formulation network model based on applying a probabilistic graphical model over design variable feature data extracted from a corpus of product formulation data. The unsupervised formulation network model preferably relates to a plurality of distinct design variables identified from the corpus of product formulation data represented as a plurality of distinct nodes that may be interconnected based on derived relationship inferences of the probabilistic graphical model. In one or more embodiments, unlike a supervised instance of a formulation network model, an unsupervised formulation network model may not have an assigned or intended formulation outcome or formulation objective.

In one or more embodiments, the probabilistic graphical model applied to the corpus of formulation data comprises a Bayesian network model. In a preferred embodiment, the Bayesian network model, when applied, to the corpus of formulation data creates a graphical representation of a plurality of distinct design variables identified from the formulation data and their conditional dependencies via a directed acyclic graph. Accordingly, S220 may function to apply the Bayesian network model over the corpus of formulation data may function to surface or expose each distinct design variable (or component, ingredient) that may define a potential component to a proposed product formulation and a likely conditional relationship between pairs of design variables.

It shall be recognized that while in a preferred embodiment the probabilistic graphical model implemented may be a Bayesian network, the method 200 may function to implement any suitable or type of probabilistic graphical model including Markov rando fields, Naïve Bayes classifier, dependency network, tree-augmented classifier, a factor graph, a clique tree, a chain graph, an ancestral graph, random field, and/or the like.

Additionally, or alternatively, generating an unsupervised formulation network model may include setting one or more hyperparameters of the probabilistic graphical model (PGM). In one or more embodiments, S220 may function to set a structural coefficient or index of the PGM to control a maximum number of edges or connections that may be set between pairs of design variable nodes. For instance, S220 may function to set a low structure coefficient or index, such as two (2), thereby causing the PGM to produce a maximum of 2 edge connections to a given node within the network model. Additionally, or alternatively, S220 may function to set a maximum node hyperparameter value that, in operation, limits the number of design variable nodes that the PGM may produce over the corpus of formulation data.

2.30 Supervised Production Formulation Network Model Generation

S230, which includes converting an unsupervised formulation network model to a supervised formulation network model, may function to convert the unsupervised formulation network model to a supervised formulation network model based on setting a formulation outcome for the unsupervised formulation network model. A formulation outcome or formulation objective, as referred to herein, preferably relates to a goal of a formulation or a target of a proposed formulation of a product or the like. As a non-limiting example, a formulation outcome may be set as "tartness" for a given product that is subject to formulation where one or more proposed formulations (i.e., proposed combination of ingredients/design variables) by the system and/or service implementing the method 200 may attempt to optimize for tartness.

In a preferred embodiment, converting the unsupervised formulation network model to a supervised formulation network model includes interconnecting at least a subset of a plurality of distinct design variable nodes of the unsupervised formulation network model to a user-immutable node associated with select formulation outcome based on identifying that each design variable associated with the subset of the plurality of distinct nodes probabilistically contribute to a value of the formulation outcome. Accordingly, in such embodiments, a designation or integration of a formulation outcome directs or re-defines a structure of the formulation network model such that a potential relationship of each distinct design variable to the designated formulation outcome may be defined and/or shown.

Additionally, or alternatively, S230 may function to create a plurality of distinct instances of the supervised formulation network model based on setting or designating a distinct formulation target or formulation outcome for each of a plurality of instances of the unsupervised formulation network. That is, S230 may function to identifying a plurality of distinct formulation outcomes that may be relevant in a design of a target product and distinctly set each one of the distinct formulation outcomes to a copy or an instance of the unsupervised formulation network model. As a non-limiting example, for three distinct formulation outcomes, such as "tartness", "cost to produce", "shelf life", S220 may function to apply each formulation outcome to a copy or an instance of the unsupervised formulation network model, such that in each instance, the variable may be arranged towards the distinct formulation outcome based on derived relationships between the design variable nodes to the distinct formulation outcome. Thus, in one or more embodiments, while an initial unsupervised formulation network model may be created, multiple distinct instances or variations of the supervised formulation network model may be created based on the formulation outcome designated to the formulation network model. Accordingly, S230 may function to create supervised formulation network models on a per distinct formulation outcome basis.

2.40 Parameter Value Computation of Supervised Model Components

S240, which includes identifying component values of the supervised formulation network model, may function to identify parameter values for each component of the supervised formulation network model. In a preferred embodiment, S240 may function to compute a parameter value for each distinct design variable node and each distinct dependency connection or edge between pairs of design variable nodes represented within the supervised formulation network model. It shall be recognized that S240 may function to compute or identify component values per supervised formulation network model instance since each instance may have a different formulation outcome and therefore, parameter values towards each distinct formulation outcome may vary.

Node Parameter Values

In one or more embodiments, identifying component values of the supervised formulation network model includes computing parameter values for each of the plurality of distinct nodes of the supervised formulation network model. Accordingly, in such embodiments, S240 may function to derive or compute an outcome-contributory value for each of the plurality of distinct design variables of the supervised formulation network model. An outcome-contributory value for a given design variable or design variable node preferably relates to an estimated contribution of a target design variable to a value of the formulation outcome when present as a component in a formulation. In one or more embodiments, an outcome-contributory value of a given design variable may add or subtract from a value of a target formulation outcome.

In one or more embodiments, deriving the outcome-contributory value for each one of the plurality of distinct design variables includes calculating a standardized direct effect metric value for each one of the plurality of distinct design variables. In such embodiments, S240 may function to calculate the direct effect metric value based on identifying a first ratio that includes a measure of change in a value of a target formulation outcome relative to a measure of change in a value of a target one of the plurality of distinct design variables. Additionally, S240 may function to compute a product between the first ratio and a second ratio that includes a standard deviation of the target one of the plurality of distinct design variables over a standard deviation of the formulation outcome. In such embodiments, the resultant product value informs or defines the direct effect metric value that preferably identifies an estimation of a normalized contribution of a given design variable towards the target formulation outcome.

Once an outcome-contributory value may be computed for each of the plurality of distinct design variable nodes of the supervised formulation network model, S240 may function to either or assign (as metadata or the like) a respective outcome-contributory value to the respective design variable node of the supervised formulation network model.

Dependency Connection Parameter Values

In one or more embodiments, identifying component values of the supervised formulation network model includes computing parameter values for each of the plurality of distinct dependency connections of the supervised formulation network model. In such embodiments, S240 may function to compute a strength of connection metric value for each of a plurality of distinct pairs of design variables having a dependency connection. A strength of connection metric value preferably relates to an estimated contribution of a target pairing of design variables toward a value of a formulation outcome. That is, in one or more embodiments, the strength of connection may identify an affect or contributory value of a combination of design variables (sharing a dependency or edge connection within the supervised formulation network model).

In a preferred embodiment, S240 may function to automatically capture or identify the dependencies between all design variables of the supervised formulation network model. In such preferred embodiment, S240 may function to apply a structural learning algorithm over a plurality of design variable nodes of the supervised formulation network that, when executed, exposes or surfaces edge connections or dependency connections between all pairs of design variables that may have a likely or probable dependency between them.

In one or more embodiments, S240 may function to set, as a hyperparameter of the structure learning algorithm, a dependency significance parameter value or threshold. In such embodiments, the dependency significance parameter preferably establishes a minimum strength of connection parameter value for a given pair of design variable nodes that, if satisfied, informs or sets an edge or dependency connection between the given pair of design variable nodes. Accordingly, during an execution of the structural learning algorithm, if a computed dependency value for a distinct pair of design variables satisfies the dependency significance threshold, S240 may function to automatically define a graphical edge or dependency connection between the distinct pair of design variables.

In one or more embodiments, computing a strength of connection metric value for each of the plurality of distinct pairs of distinct design variables includes implementing a parameter learning algorithm that may function to estimate a conditional probability distribution for each of the plurality of distinct variables of the supervised formulation network. In such embodiments, S240 may function to compute a first Kullback-Leibler (KL) divergence between a conditional probability distribution for each of the plurality of distinct variables with the dependency connection and further compute a second KL divergence between a conditional probability distribution for each of the plurality of distinct variables without the dependency connection. In response to computing the first and second KL divergence, S240 may function to calculate the strength of connection metric value for a respective one of the plurality of distinct pairs based on a summation of the first KL divergence and the second KL divergence for the respective one of the plurality of distinct pairs.

2.50 Generating a Graphical Rendering of the Supervised Formulation Model

S250, which includes generating a graphical rendering of the supervised formulation network model, may function to generate, via a graphical user interface, a graphical rendering of the supervised formulation model. In a preferred embodiment, the graphical rendering of the supervised formulation model includes a plurality of distinct nodes representing a plurality of distinct design variables associated with a target product and a plurality of distinct graphical connections between distinct pairs of the plurality of distinct variables.

Additionally, or alternatively, a display size of each of the plurality of distinct nodes may be differentiated based on a derived outcome-contributory value for each of the plurality of distinct design variables. In one or more embodiments, the outcome-contributory value for each of the plurality of distinct design variables of the supervised formulation graph may be normalized to a node size scale, which may then inform a respective node display size within the graphical rendering of the supervised formulation network model.

Additionally, or alternatively, each of a plurality of distinct graphical connections may be set between pairs of design variable nodes or defined based on identifying the dependency connection between each of the plurality of distinct design variables. In one or more embodiments, a display size or display attribute of each of the plurality of distinct graphical connections may be differentiated based on a computation of a strength of connection metric value for each of the plurality of distinct pairs of distinct design variables having a dependency connection.

Additionally, or alternatively, each of the plurality of distinct nodes representing the plurality of distinct design variables within the supervised formulation network model may selectable via a user selection that includes one or more of a user action or a user input applied to the graphical rendering of the supervised formulation network model.

Additionally, or alternatively, in response to a user selection, S250 may function to modify an appearance of the graphical rendering of the supervised formulation network model preferably to make prominent the user selection of one or more components, sections, or nodes of the graphical rendering of the supervised formulation network model. In one or more embodiments, a modification of the graphical rendering of the supervised formulation network model may include reducing an opacity of the plurality of distinct nodes of the supervised formulation network model that are not selected. Accordingly, in such embodiments, the unselected components of the graphical rendering of the formulation network model may become less visible or invisible.

Additionally, or alternatively, in response to the user selection of a distinct node of the plurality of distinct nodes, S250 may function to modify an appearance of the graphical rendering of the supervised formulation network model that includes a modification that increases a prominence of a subset of the plurality of distinct nodes of the supervised formulation network model that are connected to the distinct node selected by the user based on the strength of connection metric value of the subset of the plurality of distinct nodes to the distinct node satisfying a minimum strength of connection metric value.

Additionally, or alternatively, in response to the user selection of a distinct node of the plurality of distinct nodes, S250 may function to modify an appearance of the graphical rendering of the supervised formulation network model that includes modification that increases a prominence of a distinct dependency connection between the or selected distinct node and one node of the plurality of distinct nodes having a highest strength of connection metric value to the distinct node. As a non-limiting example, if in an unselected state, all or substantially all dependency connections within the supervised formulation network model may be displayed in a single manner (e.g., a single color, such as red or the like), S250 may function to prominently display the dependency connection between a selected design variable node and another connected design variable node having the strongest or highest strength of connection value in a different color from the remaining connected nodes. For instance, the strongest connection between a selected node and a connected node having a highest strength of connection may be shown in a white color while a plurality of other node connections to the selected node may be shown in a same color, such as red.

It shall be recognized that the term prominence, as referred to herein, preferably relates to a change of an appearance of either a selected or unselected portion of a graphical rendering of the formulation network model wherein a visible appearance of the selected components relative to the unselected components are contrasted, such that the display of one is increased in color or appearance while the other is diminished in appearance or color on the same graphical rendering of the formulation network model.

Additionally, or alternatively, a graphical rendering of the supervised formulation network, via the graphical user interface, may include a graphical object that includes a toggle that, when manipulated by input of a user, switches between the plurality of distinct instances of the supervised formulation network model. In such embodiments, S250 may function to configure the toggle to enable a user to switch between distinct formulation outcomes set to the distinct instances of the supervised formulation network model. Accordingly, once the toggle graphical object is manipulated, S250 may function to switch or change a display of the graphical user interface from a first instance of the supervised formulation network model having a setting of a first formulation outcome to a second instances of the supervised formulation network model having a setting of a second formulation outcome.

Additionally, or alternatively, S250 may function to enable a generation of a target formulation proposal that likely satisfies a target formulation objective based on extracting a plurality of distinct design variables from the supervised formulation network model based on design variable node selections by a user.

It shall be noted that, in response to or based on receiving a formulator or subscriber request to modify a target formulation optimization function, S250 may function to re-execute one or more of S210, S220, S230, S240, and/or S250.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for accelerating formulation design, the method comprising:
   at a remote formulation service that is implemented by a network of distributed computing systems:
   generating an unsupervised formulation network model based on applying a probabilistic graphical model over design variable feature data extracted from a corpus of product formulation data;
   converting the unsupervised formulation network model to a supervised formulation network model based on setting a formulation outcome for the unsupervised formulation network model;
   deriving an outcome-contributory value for each of a plurality of distinct design variables of the supervised formulation network model;
   identifying a dependency connection between each of a plurality of distinct pairs of distinct design variables of the supervised formulation network model based on a computation of dependency values between the plurality of distinct pairs of distinct design variables;
   computing a strength of connection metric value for each of the plurality of distinct pairs of distinct design variables having the dependency connection, wherein the strength of connection metric value indicates an estimated contribution of a target pairing of design variables toward the value of the formulation outcome; and
   generating, via a graphical user interface, a graphical rendering of the supervised formulation network model, wherein the graphical rendering of the supervised formulation network model comprises:
   a plurality of distinct nodes representing the plurality of distinct design variables, wherein a display size of each of the plurality of distinct nodes is differentiated based on the derived outcome-contributory value for each of the plurality of distinct design variables; and
   a plurality of distinct graphical connections between the distinct pairs of the plurality of distinct design variables, wherein each of the plurality of distinct graphical connections is set based on the identifying the dependency connection between each of the plurality of distinct pairs of distinct design variables, and wherein a display size of each of the plurality of distinct graphical connections is differentiated based on the computation of the strength of connection metric value for each of the plurality of distinct pairs of distinct design variables having the dependency connection.

2. The computer-implemented method according to claim 1 further comprising:
   creating a plurality of distinct instances of the supervised formulation network model based setting a distinct formulation target for each of a plurality of distinct instances of the unsupervised formulation network model.

3. The computer-implemented method according to claim 2 further comprising:
   rendering, via the graphical user interface, a graphical object comprising a toggle that, when manipulated by input of a user, switches between the plurality of distinct instances of the supervised formulation network model, wherein the switching changes a display of the graphical user interface from a first instance of the supervised formulation network model having a setting of a first formulation outcome to a second instances of the supervised formulation network model having a setting of a second formulation outcome.

4. The computer-implemented method according to claim 1, wherein
   each of the plurality of distinct nodes representing the plurality of distinct design variables within the graphical rendering of the supervised formulation network model is selectable via a user selection comprising one or more of a user action or a user input applied to the graphical rendering of the supervised formulation network model.

5. The computer-implemented method according to claim 4, wherein:
   in response to the user selection, modifying an appearance of the graphical rendering of the supervised formulation network model, and
   the modification includes reducing an opacity of the plurality of distinct nodes of the supervised formulation network model that are not selected.

6. The computer-implemented method according to claim 4, wherein:
   in response to the user selection of a distinct node of the plurality of distinct nodes, modifying an appearance of the graphical rendering of the supervised formulation network model,
   the modification includes increasing a prominence of a subset of the plurality of distinct nodes of the supervised formulation network model that are connected to the distinct node selected by the user based on the strength of connection metric value of the subset of the plurality of distinct nodes to the distinct node satisfying a minimum strength of connection metric value.

7. The computer-implemented method according to claim 4, wherein:
   in response to the user selection of a distinct node of the plurality of distinct nodes, modifying an appearance of the graphical rendering of the supervised formulation network model,
   the modification includes increasing a prominence of a distinct dependency connection between the distinct node and one node of the plurality of distinct nodes having a highest strength of connection metric value to the distinct node.

8. The computer-implemented method according to claim 1, wherein
   the unsupervised formulation network model relates to a plurality of distinct design variables of the corpus of product formulation data represented by the plurality of distinct nodes that are interconnected based on derived relationship inferences of the probabilistic graphical model.

9. The computer-implemented method according to claim 1, wherein the converting includes:
interconnecting at least a subset of the plurality of distinct nodes of the unsupervised formulation network model to a user-immutable node associated with the formulation outcome based on identifying that each design variable associated with the subset of the plurality of distinct nodes probabilistically contribute to a value of the formulation outcome.

10. The computer-implemented method according to claim 1, wherein
the outcome-contributory value indicates an estimated contribution of a target design variable to a value of the formulation outcome when present as a component in a formulation.

11. The computer-implemented method according to claim 10, wherein
deriving the outcome-contributory value for each one of the plurality of distinct design variables includes calculating a standardized direct effect metric value for each one of the plurality of distinct design variables based on:
identifying a first ratio comprising a measure of change in the value of the formulation outcome relative to a measure of change in a value of a target one of the plurality of distinct design variables; and
identifying a product between the first ratio and a second ratio comprising a standard deviation of the target one of the plurality of distinct design variables over a standard deviation of the formulation outcome.

12. The method according to claim 1, wherein
wherein defining the dependency connection between each of a plurality of distinct pairs of distinct design variables includes:
applying a structural learning algorithm over a plurality of design variable nodes of the supervised formulation network model;
setting a dependency significance threshold, wherein if a computed dependency value for a distinct pair of design variables satisfies the dependency significance threshold, then setting a distinct dependency connection between the distinct pair of design variables.

13. The computer-implemented method according to claim 1, wherein
computing a strength of connection metric value for each of the plurality of distinct pairs of distinct design variables includes:
implementing a parameter learning algorithm that estimates a conditional probability distribution for each of the plurality of distinct variables of the supervised formulation network model;
computing a first Kullback-Leibler (KL) divergence between a conditional probability distribution for each of the plurality of distinct variables with the dependency connection;
compute a second KL divergence between a conditional probability distribution for each of the plurality of distinct variables without the dependency connection; and
wherein the strength of connection metric value for a respective one of the plurality of distinct pairs is based on a summation of the first KL divergence and the second KL divergence for the respective one of the plurality of distinct pairs.

14. The computer-implemented method according to claim 1, further comprising:
generating a target formulation proposal that likely satisfies a target formulation objective based on extracting a plurality of distinct design variables from the supervised formulation network model.

15. The computer-implemented method according to claim 1, wherein:
the probabilistic graphical model comprises a Bayesian network model; and
the unsupervised formulation network model comprises a directed acyclic graph.

16. A method comprising:
generating, by one or more computers, an unsupervised formulation network model based on applying a probabilistic graphical model over design variable feature data extracted from a corpus of product formulation data;
converting the unsupervised formulation network model to a supervised formulation network model based on setting a formulation outcome for the unsupervised formulation network model;
deriving an outcome-contributory value for each of a plurality of distinct design variables of the supervised formulation network model;
identifying a dependency connection between each of a plurality of distinct pairs of distinct design variables of the supervised formulation network model based on a computation of dependency values between the plurality of distinct pairs of distinct design variables;
computing a strength of connection metric value for each of the plurality of distinct pairs of distinct design variables having the dependency connection, wherein the strength of connection metric value indicates an estimated contribution of a target pairing of design variables toward the value of the formulation outcome; and
generating, via a graphical user interface, a graphical rendering of the supervised formulation network model, wherein the graphical rendering of the supervised formulation network model comprises:
a plurality of distinct nodes representing the plurality of distinct design variables, wherein a display size of each of the plurality of distinct nodes is differentiated based on the derived outcome-contributory value for each of the plurality of distinct design variables; and
a plurality of distinct graphical connections between the distinct pairs of the plurality of distinct design variables, wherein each of the plurality of distinct graphical connections is set based on the identifying the dependency connection between each of the plurality of distinct pairs of distinct design variables, and wherein a display size of each of the plurality of distinct graphical connections is differentiated based on the computation of the strength of connection metric value for each of the plurality of distinct pairs of distinct design variables having the dependency connection.

17. A computer-program product embodied in a non-transitory machine-readable storage medium storing computer instructions that, when executed by one or more processors, perform operations comprising:
generating, by one or more computers, an unsupervised formulation network model based on applying a probabilistic graphical model over design variable feature data extracted from a corpus of product formulation data;

converting the unsupervised formulation network model to a supervised formulation network model based on setting a formulation outcome for the unsupervised formulation network model;

deriving an outcome-contributory value for each of a plurality of distinct design variables of the supervised formulation network model;

identifying a dependency connection between each of a plurality of distinct pairs of distinct design variables of the supervised formulation network model based on a computation of dependency values between the plurality of distinct pairs of distinct design variables;

computing a strength of connection metric value for each of the plurality of distinct pairs of distinct design variables having the dependency connection, wherein the strength of connection metric value indicates an estimated contribution of a target pairing of design variables toward the value of the formulation outcome; and generating, via a graphical user interface, a graphical rendering of the supervised formulation network model, wherein the graphical rendering of the supervised formulation network model comprises:

a plurality of distinct nodes representing the plurality of distinct design variables, wherein a display size of each of the plurality of distinct nodes is differentiated based on the derived outcome-contributory value for each of the plurality of distinct design variables; and a plurality of distinct graphical connections between the distinct pairs of the plurality of distinct design variables, wherein each of the plurality of distinct graphical connections is set based on the identifying the dependency connection between each of the plurality of distinct pairs of distinct design variables, and wherein a display size of each of the plurality of distinct graphical connections is differentiated based on the computation of the strength of connection metric value for each of the plurality of distinct pairs of distinct design variables having the dependency connection.

* * * * *